United States Patent
Chottiner et al.

(10) Patent No.: US 8,918,994 B2
(45) Date of Patent: Dec. 30, 2014

(54) BALANCING A PENDULUM-ABSORBER CRANKSHAFT

(71) Applicant: Ford Global Technologies, LLC, Dearborn, MI (US)

(72) Inventors: Jeffrey Eliot Chottiner, Farmington Hills, MI (US); Rick L. Williams, Canton, MI (US); John Edward Brevick, Livonia, MI (US); Gregory Michael Pietron, Canton, MI (US); Matthew David Hammond, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 13/654,234

(22) Filed: Oct. 17, 2012

(65) Prior Publication Data

US 2014/0102248 A1 Apr. 17, 2014

(51) Int. Cl.
*F16C 3/10* (2006.01)
*F16F 15/32* (2006.01)

(52) U.S. Cl.
CPC ........................................ *F16F 15/32* (2013.01)
USPC ........................ 29/888.08; 74/603; 123/192.2

(58) Field of Classification Search
CPC ................... F16C 3/20; F16F 15/32
USPC ................. 29/888.08, 557; 74/595, 596, 603; 123/192.1, 192.2
See application file for complete search history.

(56) References Cited

U.S. PATENT DOCUMENTS

| | | | | |
|---|---|---|---|---|
| 1,534,411 A * | 4/1925 | Potter | | 74/603 |
| 1,749,807 A * | 3/1930 | Ford | | 74/603 |
| 3,673,651 A * | 7/1972 | Stewart | | 29/888.08 |
| 4,779,316 A * | 10/1988 | Cherry et al. | | 74/603 |
| 4,896,634 A | 1/1990 | Kronich | | |
| 5,408,745 A | 4/1995 | Tomiyama et al. | | |
| 5,435,059 A | 7/1995 | Chawla | | |
| 5,983,752 A * | 11/1999 | Wahlstrom | | 74/603 |
| 6,026,776 A | 2/2000 | Winberg | | |
| 6,397,463 B1 | 6/2002 | Assie | | |
| 6,418,902 B1 * | 7/2002 | Ericson | | 123/192.2 |
| 6,695,601 B2 | 2/2004 | Coffey | | |
| 2013/0232791 A1 * | 9/2013 | Ohnuma et al. | | 29/888.08 |

FOREIGN PATENT DOCUMENTS

JP 58090344 A 5/1983

* cited by examiner

*Primary Examiner* — David Bryant
*Assistant Examiner* — Steven A Maynard
(74) *Attorney, Agent, or Firm* — Greg Brown; Alleman Hall McCoy Russell & Tuttle LLP

(57) ABSTRACT

A method of balancing a crankshaft includes connecting a torsion-absorbing pendulum to a cheek of the crankshaft, which is coupled to a crankpin. As the pendulum connected to the cheek has insufficient mass to balance the crankshaft, a lightening bore is formed through a bisection plane of the cheek. In forming the lightening bore, enough material is removed from the cheek so that the mass of the pendulum becomes sufficient to balance the crankshaft.

9 Claims, 5 Drawing Sheets

BALANCING A PENDULUM-ABSORBER CRANKSHAFT

TECHNICAL FIELD

This application relates to the field of motor-vehicle engineering, and more particularly, to balancing a pendulum-absorber crankshaft of a motor-vehicle engine.

BACKGROUND AND SUMMARY

In an internal combustion engine, a crankshaft may be used to convert the reciprocating motion of the pistons into rotational motion. The crankshaft may include, offset from its rotational axis, a plurality of crankpins. Each crankpin is coupled through a bearing to a piston rod, which is linked to a corresponding piston. The crankshaft itself is supported by two or more main bearings, in which it rotates.

To prevent excessive vibration while rotating, the crankshaft must be accurately balanced. To this end, the crankshaft may include a series of counterweights that counterbalance the mass of each crankpin, associated piston, piston rod, and entrained lubricant. In a traditional approach, the crankshaft may be constructed with initially oversized counterweights. Then, in a subsequent balancing step, lightening bores may be drilled into the counterweights to remove mass and thereby bring the crankshaft into balance. In this approach, the lightening bores may be arranged virtually anywhere on the counterweight, with no adverse effect on the operation of the crankshaft.

The approach summarized above may prevent excessive vibration of a crankshaft perpendicular to its rotational axis, but does not address the torsional vibration that may occur about the rotational axis. More specifically, each piston rod transmits a torsional impulse to its attached crankpin during the power stroke of the associated piston. With each torsional impulse received, the crankshaft twists slightly about its rotational axis, then twists back after the power stroke. In this manner, periodic torsional impulses from each of the piston rods may drive a complex torsional vibration in the crankshaft. Depending on conditions, such vibration may coincide with an order of natural resonance frequency of the crankshaft. When this occurs, the vibration may increase in amplitude, such that the crankshaft is inelastically deformed, causing material failure.

Certain crankshaft components may be used to suppress torsional vibration and thereby protect the crankshaft from material failure—flywheels and torsional dampeners, as examples. Another approach is to install one or more so-called 'pendulum absorbers' on the crankshaft. A pendulum absorber is a mass non-rigidly linked to the crankshaft at a predetermined distance from the rotational axis of the crankshaft. When the crankshaft receives a torsional impulse at a crankpin, that impulse is partly absorbed in accelerating the mass of the pendulum absorber in the direction of the impulse. Likewise, when the crankshaft relaxes after the impulse, the relaxation is opposed by the inertia of the mass that was accelerated. In order to suppress natural vibrational modes of a crankshaft, a pendulum absorber may be 'tuned' by adjustment of its mass M and of the distance L between its center-of-mass and the rotational axis of the crankshaft.

In some crankshafts, pendulum absorbers may replace some or all of the traditional counterweights, providing balance as well as torsional-vibration absorption. With this configuration, however, it is not possible to use the traditional balancing approach—i.e., to oversize the pendulum absorber and then drill an appropriately sized lightening bore into it, to reduce the mass. This is because the mass M of the pendulum absorber affects the order to which it is tuned for a given rotational speed and cylinder firing order.

Accordingly, one embodiment of this disclosure provides an altogether different method of balancing a crankshaft. The method includes connecting a torsion-absorbing pendulum to a cheek of the crankshaft, which is coupled to a crankpin. The pendulum connected to the cheek has insufficient mass to balance the crankshaft. A lightening bore is then formed through a bisection plane of the cheek. In forming the lightening bore, enough material is removed from the cheek so that the mass of the pendulum becomes sufficient to balance the crankshaft. In this example method, the bisection plane includes both a rotation axis of the crankpin and a rotation axis of the crankshaft. By boring into the cheek instead of the pendulum, the desired torsional-vibration absorbing properties of the pendulum are unchanged by the balancing procedure. Moreover, the placement of the lightening bore within the bisection plane of the cheek preserves the structural integrity of the crankshaft.

The summary above is provided to introduce a selected part of this disclosure in simplified form, not to identify key or essential features. The claimed subject matter, defined by the claims, is limited neither to the content of this summary nor to implementations that address the problems or disadvantages noted herein.

DETAILED DESCRIPTION

Figure 1:
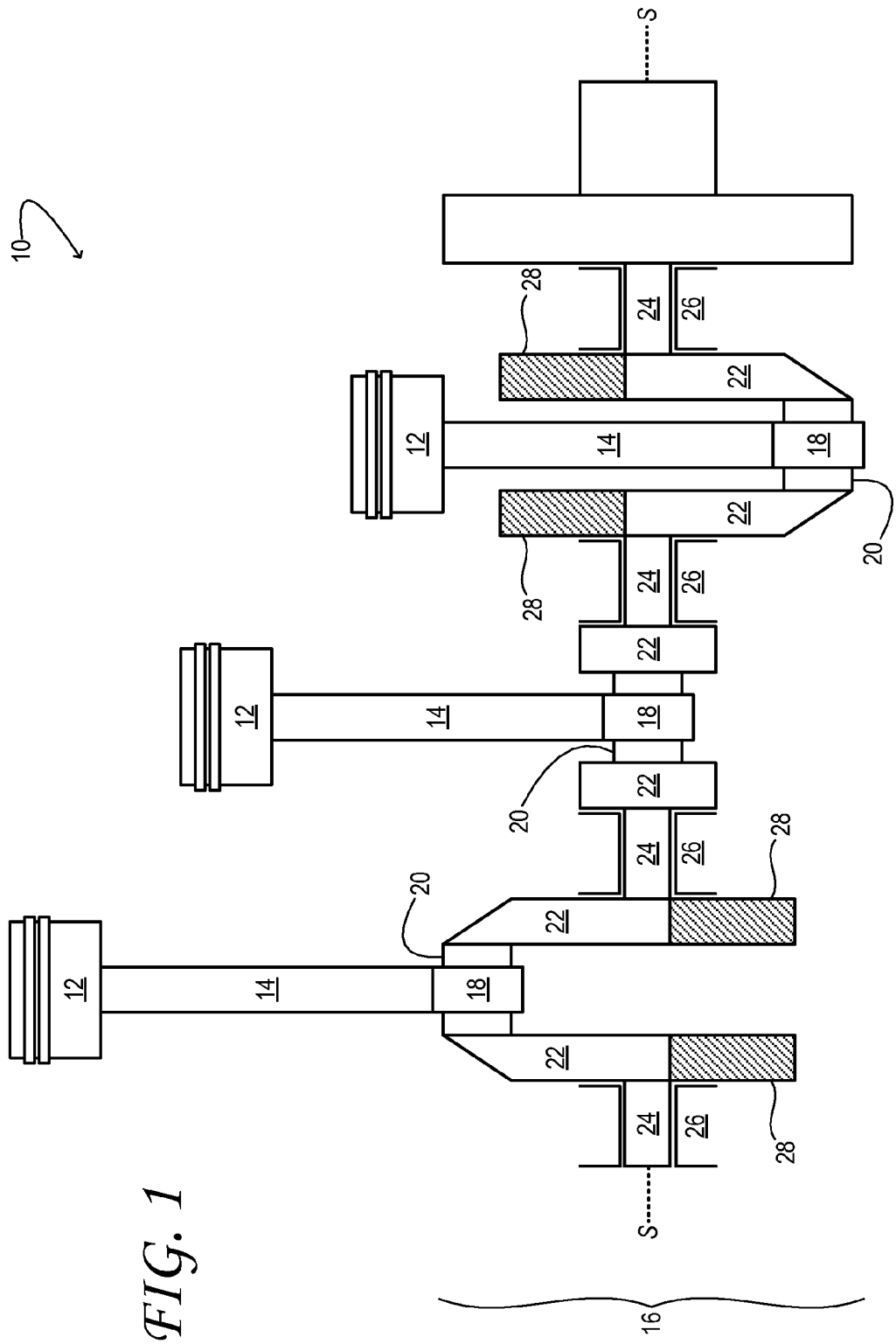
FIG. 1 schematically shows aspects of an example motor-vehicle engine in accordance with an embodiment of this disclosure.

FIG. 1 schematically shows aspects of an example engine 10 of a motor vehicle. The engine includes a plurality of reciprocating pistons 12. Although three pistons are shown in FIG. 1, this disclosure is equally applicable to engines having more or fewer pistons. Each piston is pivotally coupled to one end of a corresponding piston rod 14. The other end of each piston rod is pivotally coupled to crankshaft 16 through a rod bearing 18. More specifically, a cylindrical crankpin journal—crankpin 20, hereinafter—is rotationally coupled inside each rod bearing. Each crankpin is located between a pair of cheeks 22, and coupled to the same. In the embodiment of FIG. 1, adjacent pairs of cheeks are connected by a plurality main journals 24. The main journals are rotationally coupled inside a corresponding plurality of main bearings 26.

Crankshaft 16 includes a plurality of pendulum absorbers—pendula 28, hereinafter'which provide torsional-vibration absorption for the crankshaft. Each pendulum may be of a predetermined mass; it may be connected at a predetermined distance from the rotation axis of the crankshaft, so as to absorb torsional vibration of a predetermined order in the rotating crankshaft. More specifically, the mass M of each pendulum and the distance L between the center-of-mass of the pendulum and the rotational axis S of the crankshaft may be adjusted in order to provide vibration absorption at any chosen order—e.g., an integer or half-integer order torsional deflection of the crankshaft.

Figure 2:
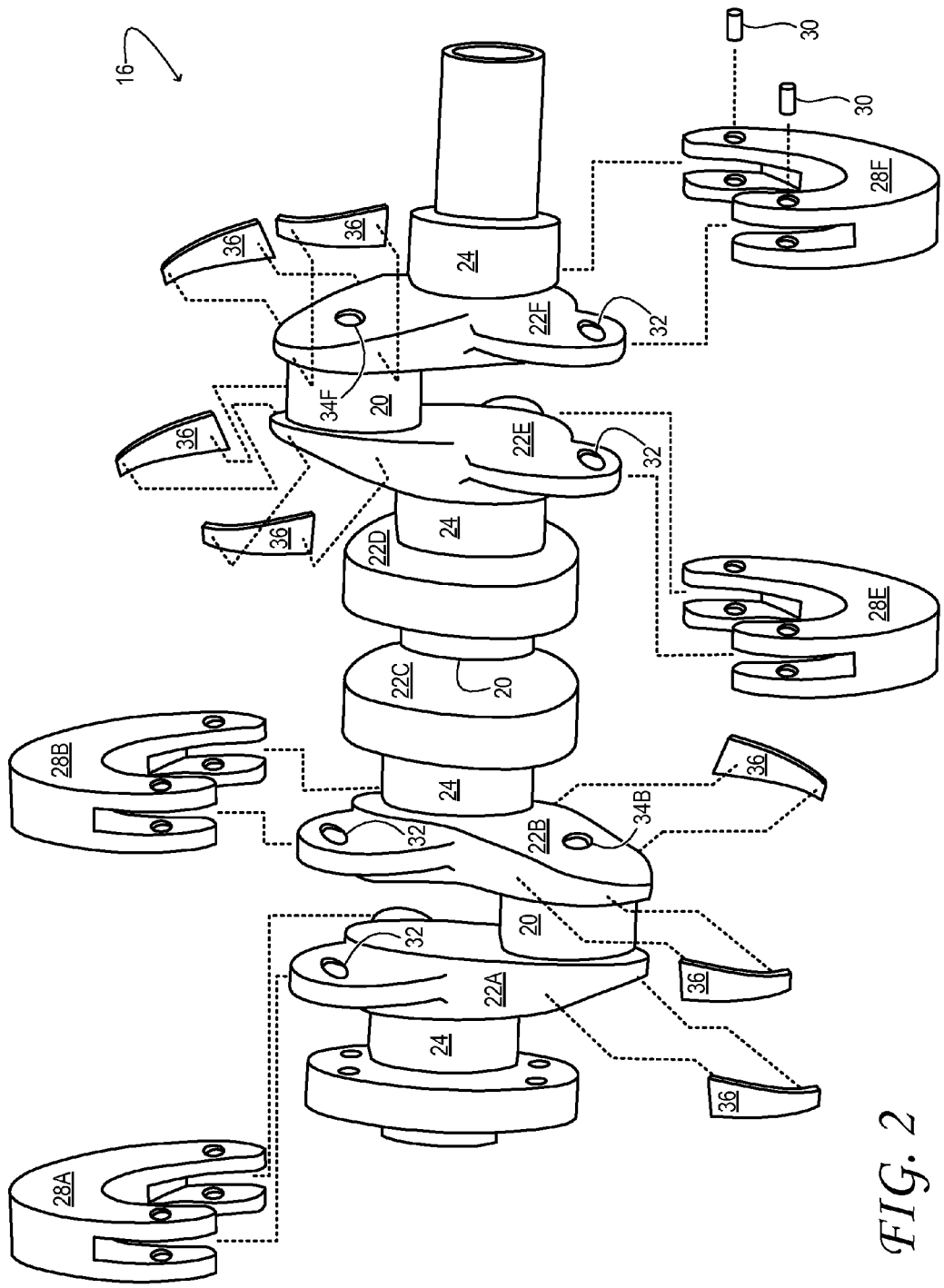
FIG. 2 shows aspects of an example crankshaft in accordance with an embodiment of this disclosure.

FIG. 2 provides a more detailed view of crankshaft 16 in one embodiment. Here, each torsional-vibration absorbing pendulum 28 is a bifilar pendulum. In the illustrated embodiment, pendula 28A, 28B, 28E, and 28F are pivotally connected to corresponding cheeks 22, each with a pair of hardened fulcrum pins 30. Held in place by suitable retaining componentry (not shown in the drawings), the fulcrum pins move within loose-fitting bushings 32 on the attached cheek, allowing the pendulum to move with respect to the cheek in directions perpendicular to the rotational axis of the crankshaft. Such motion allows each pendulum to absorb torsional vibration at the order to which it is tuned. Further discussion about pendulum absorbers, including example structure and operation, is provided in U.S. Pat. No. 6,688,272 B2, which is hereby incorporated by reference herein.

Pendula 28 may serve a double purpose in engine 10. In addition to providing torsional-vibration absorption, these pendula may counterbalance the mass of crankpins 20, piston rods 14, pistons 12, and the entrained lubricant. In the illustrated embodiment, additional counterbalancing is provided by cheeks 22C and 22D, which do not include pendula, but may be counterweighted.

In the approach presented herein, one or more pendula 28 may be insufficiently massive to counterbalance the mass of the crankpins, piston rods, pistons, and entrained lubricant. Therefore, mass is removed from the attached cheek 22—on the opposite side of the rotational axis of the crankshaft—during the balancing procedure. More specifically, a predetermined (e.g., computed) mass of material may be removed from the cheek by drilling, milling, or any other form of machining. Accordingly, FIG. 2 shows lightening bore 34B in cheek 22B and lightening bore 34F in cheek 22F. In general, any cheek or cheeks of the crankshaft may include a lightening bore. In some embodiments, a given cheek may include two or more lightening bores of appropriate size and position to bring the crankshaft into balance.

Figure 3:
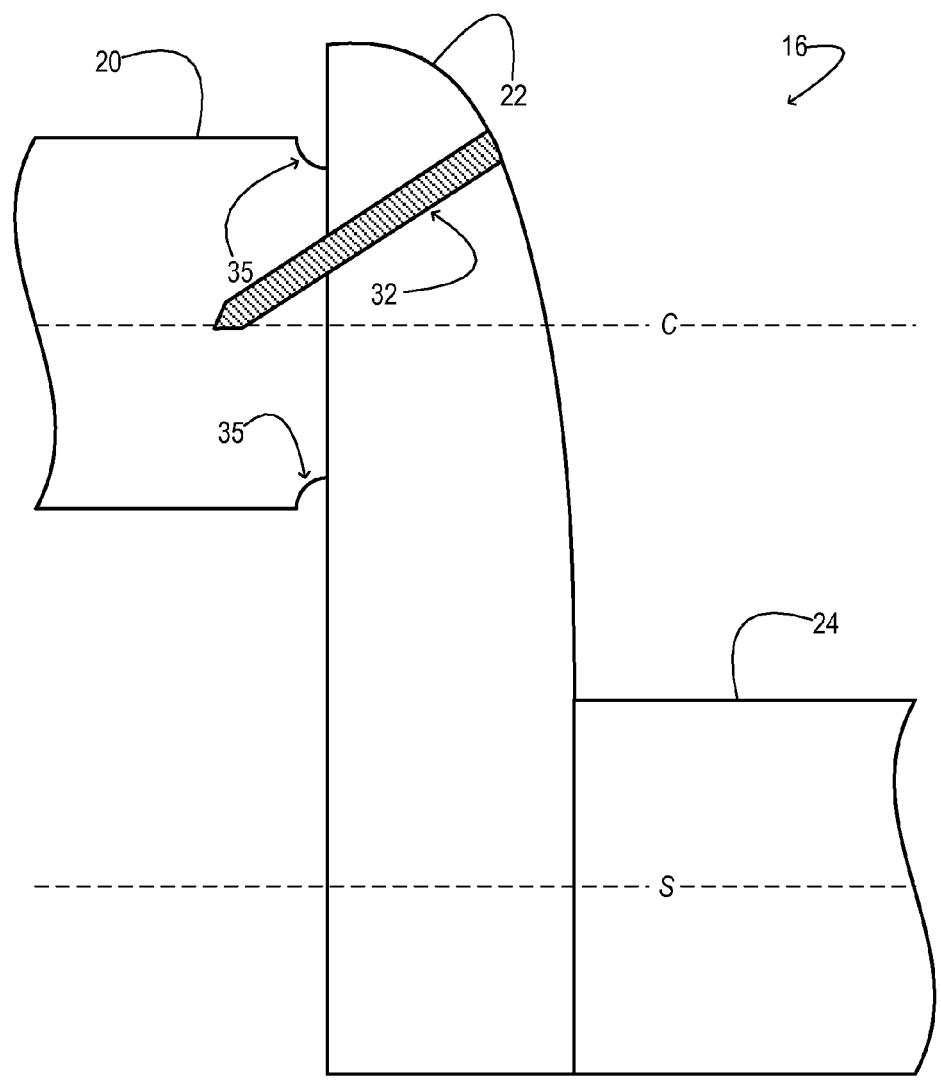
FIG. 3 shows, in cross section, a lightening bore extending into a crankshaft cheek in accordance with an embodiment of this disclosure.

To preserve the structural integrity of crankshaft 16, lightening bores 34 may not be formed just anywhere on a cheek, but only in allowed locations. One allowed location is toward the center of the cheek—e.g., along the bisection plane of a cheek. In this disclosure, the bisection plane is the plane that passes through the cheek and contains both the rotational axis C of the attached crankpin and the rotational axis S of the crankshaft. In one embodiment, the lightening bore may lie along the bisection plane, as shown in FIG. 3. In practice, the desired radial position of the lightening bore along the bisection plane (i.e., the distance away from the rotational axis S) may be determined using a state-of-the-art crankshaft balancing machine, via suitable modeling/computation. In the embodiments considered herein, at least one of the included pendula may have sufficient mass to balance the crankshaft with the lightening bore through the attached cheek, but insufficient mass to balance the crankshaft without the lightening bore.

Ideally, a single lightening bore formed along a bisection plane of a cheek can be appropriate in size and position to balance the crankshaft. Thus, a lightening bore 34 may be formed in a position computed for material removal in the crankshaft, to balance the crankshaft. Due to variability in crankshaft manufacture, however, it is possible that the position of the lightening bore required to achieve crankshaft balance may not lie exactly along the bisection plane of the cheek. Nevertheless, the bisection plane may be the only locus where a lightening bore can be formed without excessively weakening the crankshaft. To address this issue, some embodiments include side balance pads attached to any cheek in which a lightening bore is formed. Accordingly, cheeks 22A, 22B, 22E, and 22F of FIG. 2 include side balance pads 36. In one embodiment, equivalent left and right balance pads may be arranged on opposite sides of one end of crankpin 20. In one embodiment, the left and right balance pads may be of the same size, shape, and material. In other embodiments, the left and right balance pads may be at least somewhat different. In some embodiments, the left and right balance pads may include a material denser than the material from which the rest of the cheek is formed.

Figure 4:
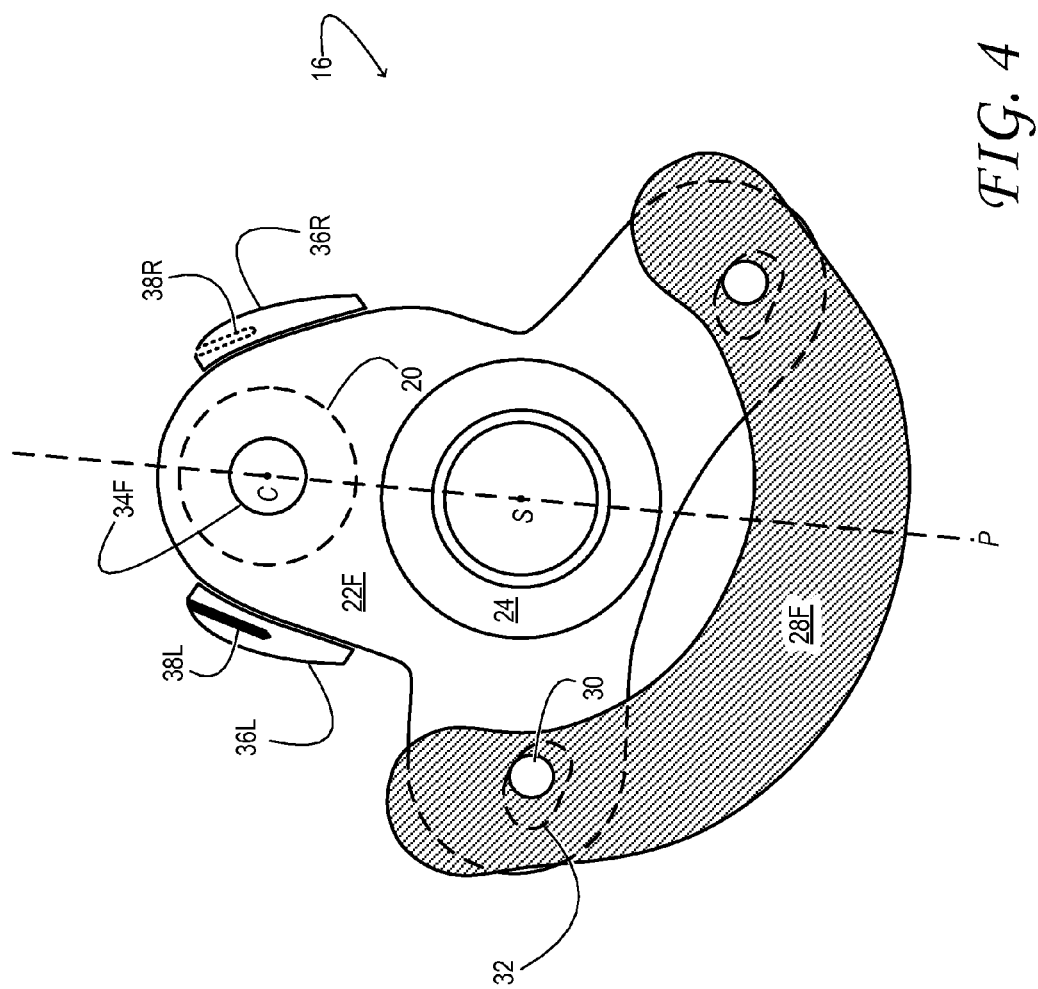
FIG. 4 shows a front view of a crankshaft in accordance with an embodiment of this disclosure.

In embodiments in which side balance pads 36 are used, additional nudging bores may be formed therein, as necessary, to nudge the required (i.e., computed) position of lightening bore 34 toward the center of the cheek. This action may entail nudging the computed position closer to the bisection plane, for example. Thus, if the computed position of the lightening bore is to the left of the bisection plane, an nudging bore may be formed in the left balance pad to nudge the computed position to the right, aligning it with the bisection plane. In this manner, the computed position for material removal in the crankshaft eventually coincides with a position where the lightening bore can actually be formed. This approach is also illustrated in FIG. 4, which provides a front view of crankshaft 16. FIG. 4 further shows bisection plane P of the cheek. As noted hereinabove, the bisection plane includes both the rotation axis C of the crankpin and the rotation axis S of the crankshaft. Lightening bore 34F lies along the bisection plane. In the illustrated embodiment, left balance pad 36L is arranged to the left side of crankpin 20, and right balance pad 36R is arranged to the right side of the crankpin.

The embodiment of FIG. 4 provides two bores in cheek 22F: lightening bore 34F formed along bisection plane P, and nudging bore 38 formed in the left balance pad 36L, to nudge the computed position of the lightening bore to align with the bisection plane. In other embodiments, the nudging bore may be formed in the right balance pad instead of the left balance pad, in the position labeled 36R. In still other embodiments, nudging bores may be formed in the left and right balance pads. Boring into both the left and right balance pads of the same cheek can effectively nudge the computed position of the lightening hole radially along the bisection plane, toward the center of the cheek. This approach may be useful if the computed position is too high on the cheek, for example.

No aspect of the drawings should be interpreted in a limiting sense, for numerous other embodiments are contemplated as well. In one embodiment, for example, a center-of-mass of each balance pad may lie outside of an orbit circumscribed by the crankpin when the crankshaft rotates. Moreover, nudging bores formed in the balance pads may have any desired orientation and any suitable length. If there is enough material in the cheek, the nudging bores may penetrate into the cheek. In some embodiments, the balance pads may be omitted entirely and nudging bores drilled directly into the cheeks, for the same purpose described above.

The configurations described above enable various methods for balancing a crankshaft. Accordingly, some such methods are now described, by way of example, with continued reference to the above configurations. It will be understood, however, that the methods here described, and others within the scope of this disclosure, may be enabled by different configurations as well.

Figure 5:
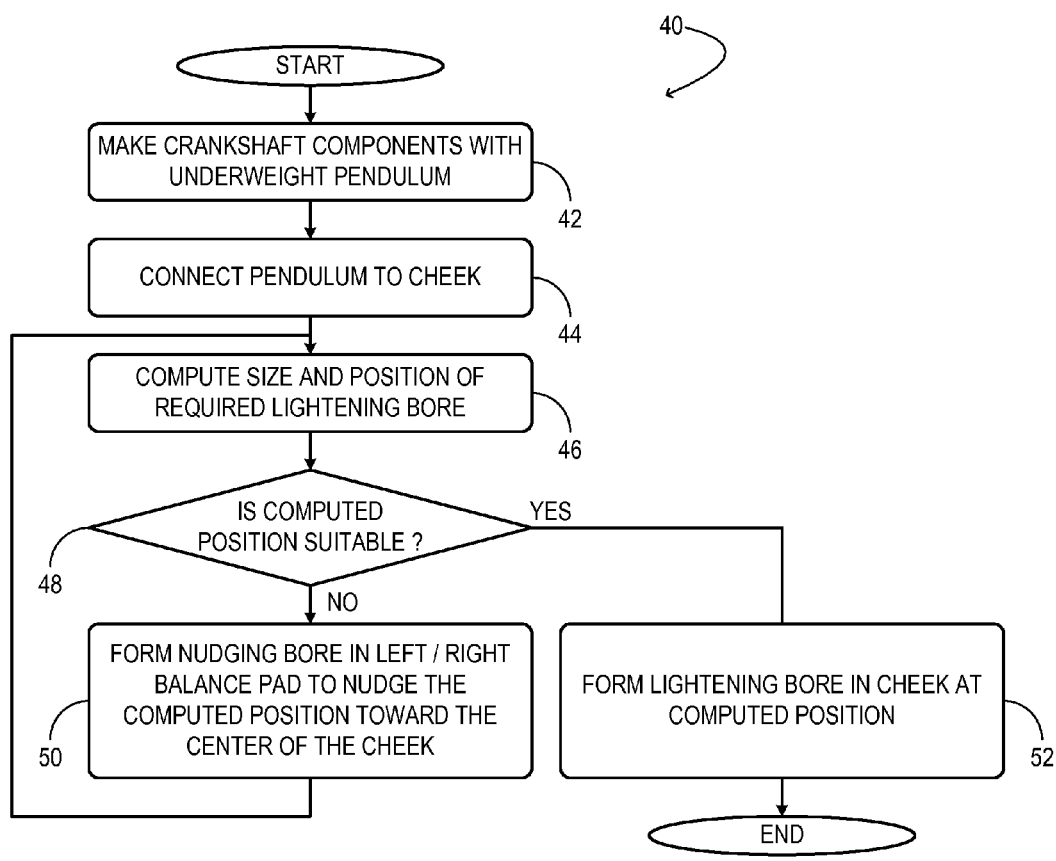
FIG. 5 illustrates an example method for balancing a crankshaft in accordance with an embodiment of this disclosure.

FIG. 5 illustrates an example method 40 for balancing a crankshaft. At 42 of method 40, the various components of the crankshaft are formed. A crankshaft applicable to this method may be formed by casting and/or forging, followed by machining. In some embodiments, components may be added to a cast and/or forged and machined crankshaft in any suitable manner—e.g., by bolting, welding, etc. As noted above, one or more underweight torsion-absorbing pendula may be formed via any suitable process, in anticipation of a balancing approach in which mass is subtracted from other portions of the crankshaft. In addition, left and right balance pads may be formed separately, cast together with the associated cheek, forged from the cheek, or in some embodiments, bolted or welded onto the cheek. At 44 at least one underweight, torsion-absorbing pendulum is connected to at least one cheek of the crankshaft. At this stage of the balancing operation, the pendulum may have insufficient mass to balance the crankshaft.

At 46 the size and position of a required lightening bore to be formed in the cheek is computed. The mass to be removed, as well as the radial position of the lightening bore along the bisection plane, may be determined using a state-of-the-art crankshaft balancing machine, further employing any suitable modeling/computational approach. In one embodiment, the lightening bore may be formed with at least five millimeters clearance from any undercut of the crankpin or oiling bore, as shown in FIG. 3.

At 48 it is determined whether the computed position is suitable. A computed position is suitable, for example, if it lies somewhere on the cheek, at a location where boring would not compromise the integrity of the crankshaft above a tolerable limit. In one embodiment, a suitable position may be a position that lies along bisection plane P, toward the center of the cheek. If the computed position is suitable, then the method advances to 52. However, if the computed position is not suitable, then the method advances to 50.

At 50 nudging bore is formed in the left or right balance pad to nudge the computed position towards the center of the cheek. In one embodiment, the nudging bore may make the computed position lie along the bisection plane P. In one embodiment, the nudging bore may be formed and extended in a closed-loop manner, with iterative recomputation of the lightening-bore position.

At 52 a lightening bore is formed in the cheek at the computed position. In one embodiment, the lightening bore may be drilled along a bisection plane of the cheek, the bisection plane including a rotation axis of the crankpin and a rotation axis of the crankshaft, as shown in FIG. 4. In one embodiment, such boring may remove enough material so that the mass of the pendulum becomes sufficient to balance the crankshaft.

In the various embodiments considered herein, the crankshaft may optionally be returned to the balancing machine to verify that it is balanced within acceptable limits. If the crankshaft is not balanced, then method 40 may be entered again at 46, whereby the lightening and nudging bores may be extended to achieve balance. In this manner, the various boring and assessing actions may be repeated, again in a closed-loop manner, until enough material is removed from the cheek to balance the crankshaft.

Aspects of this disclosure are set forth by example, with reference to the illustrated embodiments described above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

In the methods illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method of balancing a crankshaft, comprising:
connecting a torsion-absorbing pendulum to a cheek of the crankshaft, the cheek coupled to a crankpin, the pendulum having insufficient mass to balance the crankshaft; and
boring a lightening bore through a bisection plane of the cheek to remove enough material so that the mass of the pendulum becomes sufficient to balance the crankshaft, the bisection plane including a rotation axis of the crankpin and a rotation axis of the crankshaft and passing through the center of the lightening bore.

2. The method of claim 1 wherein boring through the bisection plane includes forming the lightening bore at a computed position for material removal in the crankshaft.

3. A method of balancing a crankshaft, comprising:
connecting a torsion-absorbing pendulum to a cheek of the crankshaft, the cheek coupled to a crankpin, the pendulum having insufficient mass to balance the crankshaft; and
boring through a bisection plane of the cheek to remove enough material so that the mass of the pendulum becomes sufficient to balance the crankshaft, the bisection plane including a rotation axis of the crankpin and a rotation axis of the crankshaft,
wherein boring through the bisection plane includes:
forming a nudging bore in the cheek to nudge a computed position for material removal in the crankshaft toward a center of the cheek; and
forming a lightening bore in the computed position.

4. The method of claim 1 wherein the cheek includes, on opposite sides of one end of the crankpin, a left balance pad and a right balance pad, and wherein boring through the bisection plane includes:
forming a nudging bore in the left or right balance pad to nudge a computed position for material removal in the crankshaft toward a center of the cheek; and
forming a lightening bore in the computed position.

5. The method of claim 4 further comprising casting the left and right balance pads together with the cheek.

6. The method of claim 4 further comprising forging the left and right balance pads from the cheek.

7. The method of claim 4 further comprising bolting the left and right balance pads to the cheek.

8. A method of balancing a crankshaft, comprising:
pivotally connecting a torsion-absorbing pendulum to a cheek of the crankshaft with a pair of fulcrum pins, the cheek coupled to a crankpin, the pendulum having insufficient mass to balance the crankshaft;

boring through a bisection plane of the cheek, the bisection plane including a rotation axis of the crankpin and a rotation axis of the crankshaft;

assessing balance while rotating the crankshaft; and repeating said boring and said assessing until enough material is removed from the cheek to balance the crankshaft.

9. The method of claim 8 wherein the cheek includes, on opposite sides of one end of the crankpin, a left balance pad and a right balance pad, and wherein boring through the bisection plane includes:

forming a nudging bore in the left or right balance pad to nudge a computed position for material removal in the crankshaft towards a center of the cheek; and forming the lightening bore in the computed position.

* * * * *